US008416589B2

(12) United States Patent
Portisch

(10) Patent No.: US 8,416,589 B2
(45) Date of Patent: Apr. 9, 2013

(54) METHOD FOR OPERATING A DC-DC CONVERTER IN CURRENT-MODE CONTROL

(75) Inventor: Daniel Portisch, Kleinhadersdorf (AT)

(73) Assignee: Siemens Aktiengesellschaft, München (DE)

( * ) Notice: Subject to any disclaimer, the term of this patent is extended or adjusted under 35 U.S.C. 154(b) by 0 days.

(21) Appl. No.: 12/809,188

(22) PCT Filed: Oct. 17, 2008

(86) PCT No.: PCT/EP2008/064009
§ 371 (c)(1),
(2), (4) Date: Aug. 31, 2010

(87) PCT Pub. No.: WO2009/080382
PCT Pub. Date: Jul. 2, 2009

(65) Prior Publication Data
US 2010/0315844 A1    Dec. 16, 2010

(30) Foreign Application Priority Data
Dec. 20, 2007  (AT) ................................ A 2072/2007

(51) Int. Cl.
*H02M 3/335*  (2006.01)
(52) U.S. Cl. ................ 363/21.18; 363/21.15; 363/21.17
(58) Field of Classification Search ..... 363/21.12–21.18
See application file for complete search history.

(56) References Cited

U.S. PATENT DOCUMENTS

| 4,808,882 | A | 2/1989 | Parker et al. | |
|---|---|---|---|---|
| 7,394,669 | B2* | 7/2008 | Fahlenkamp et al. | 363/21.15 |
| 7,480,159 | B2* | 1/2009 | Wei et al. | 363/21.18 |
| 7,852,648 | B2* | 12/2010 | Cho | 363/97 |
| 8,098,502 | B2* | 1/2012 | Mao et al. | 363/21.03 |
| 2004/0240207 | A1 | 12/2004 | Takezawa et al. | |
| 2005/0184632 | A1 | 8/2005 | Galvez et al. | |
| 2006/0171175 | A1* | 8/2006 | Zhu et al. | 363/21.12 |
| 2006/0215427 | A1 | 9/2006 | Ma | |
| 2007/0041226 | A1* | 2/2007 | Powers | 363/21.12 |
| 2007/0063681 | A1 | 3/2007 | Liu | |
| 2010/0124080 | A1* | 5/2010 | Yeh et al. | 363/21.12 |
| 2010/0308500 | A1* | 12/2010 | Okamoto et al. | 264/255 |

FOREIGN PATENT DOCUMENTS

| DE | 35 25 942 A1 | 1/1987 |
|---|---|---|
| DE | 3525942 * | 1/1987 |
| EP | 0 991 171 A | 4/2000 |
| EP | 2020675 A2 | 2/2009 |

(Continued)

OTHER PUBLICATIONS

K.I.Hwu and Y.H.Chen, "Applying Modified One-Comparator Counter-Based PWM Control Strategy to Flyback Converter", Center for Power Electronics Technology, National Taipei University of Technology, Taiwan, 7th International Conference on Power Electronics and Drive Systems, Nov. 27-30, 2007, pp. 225-228.

(Continued)

*Primary Examiner* — Adolf Berhane
*Assistant Examiner* — Lakaisha Jackson

(57) ABSTRACT

A method of operating a DC-DC converter according to the current mode control is provided. A current measuring signal for determining a turn-off time of a converter switching element is supplied to a PWM controller and a voltage that is proportional to the current measuring signal is compared by a comparator to a reference voltage. When the reference voltage is exceeded, the converter switching element is turned off.

8 Claims, 4 Drawing Sheets

FOREIGN PATENT DOCUMENTS

| | | | |
|---|---|---|---|
| JP | 57053059 | A | 3/1982 |
| JP | 8223923 | A | 8/1996 |
| JP | 2003219638 | A | 7/2003 |
| JP | 2007043847 | A | 2/2007 |
| WO | WO 94/22207 | A | 9/1994 |

OTHER PUBLICATIONS

Choi H-S et al., "Protection Schemes for Various Fault Conditions for Off-line Flyback Converters", Power Electronics specialists conference, 2004, PESC Apr. 2004 IEEE 35T H Annual Aachen, Germany Jun. 20-25, 2004, Piscataway, NJ, USA, IEEE, US, No. 6, pp. 4355-4359, XP010739100 ISBN: 978-0-7803-8399-9; Others.

Josh Mandelcorn, "Low Cost Digital Power Control", Electronic Products, (Online) Nov. 2007 (207-11), XP002519437 Retrieved from Internet: URL:http://www2.electronicproducts.com/Low-cost_digital_power_control-article-dp_TI_po-nov2007-html.aspx>; (Retrieved on Mar. 13, 2009); pp. 1-4, Others.

* cited by examiner

METHOD FOR OPERATING A DC-DC CONVERTER IN CURRENT-MODE CONTROL

CROSS REFERENCE TO RELATED APPLICATIONS

This application is the U.S. national stage of International application no. PCT/EP2008/064009 filed Oct. 17, 2008, and claims the benefit thereof. The International application claims the benefits of Austrian application no. A2072/2007 AT filed Dec. 20, 2007. All of the applications are incorporated by reference herein in their entirety.

FIELD OF INVENTION

The invention relates to a method for operating a DC-DC converter according to the regulating technique known as current-mode control, wherein a current measuring signal is supplied to a PWM controller for the purpose of determining the turn-off times of a converter switching element. The invention furthermore relates to a DC-DC converter for performing the method.

SUMMARY OF INVENTION

There are various types of DC-DC converter, for example buck converters, boost converters, flyback converters, forward converters, etc. Common to all of them is the principle of switching an input-side voltage by means of a converter switching element in rapid clock pulse sequence (mostly at a clock frequency in the kilohertz range) to an accumulator coil or a primary winding of a transformer. In this case, when the converter switching element is turned on, the current through the coil or, as the case may be, primary winding increases linearly. When a current-mode control form of operation is employed, said current is measured and used for determining the turn-off times.

Typically, a desired output voltage is provided by means of a voltage regulator at the output of the DC-DC converter. A deviation of the actual voltage from the nominal voltage causes a change in the output signal of said voltage regulator. With current-mode control, said output signal is proportional to a current value which the increasing current through the coil or, as the case may be, the primary winding of the DC-DC converter is to reach during a turn-on phase of the converter switching element.

For the purpose of performing the turn-off time determination the DC-DC converter typically comprises a PWM controller to which on the one hand the transmitted output signal of the voltage regulator and on the other hand a current measuring signal that is proportional to the increasing coil or primary winding current are supplied. The PWM controller compares said two signals in an internal comparator and, if the same match, turns off the converter switching element. In concrete terms the transmitted output signal of the voltage regulator that is present as a voltage at the COMP input of the PWM controller is e.g. divided by three by way of an internal voltage divider of the PWM controller. The divided voltage is compared via an internal comparator of the PWM controller with the current measuring signal that is present as a voltage at the current measuring input (I-SENSE input). If the current measuring signal is greater than the divided voltage, the internal comparator flips and the converter switching element is turned off.

In this case a current limiting means is usually provided in order to protect the components against the increasing current. With conventional PWM controllers (e.g. Unitrode Uc3842) said current limiting is accomplished by means of an internal Zener diode (e.g. breakdown voltage 1V) which is arranged in parallel with the forward DC resistance of the internal voltage divider. If, for example, the voltage regulator allows 100% output power, the voltage at the COMP input increases to e.g. 5V. Without Zener diode the internal voltage divider would then specify 5V/3=1.67V; however, the Zener diode limits the divided voltage to 1V, with the result that the converter switching element is turned off already when the current measuring signal matches said limited divided voltage which is defined as an internal current limiting of the PWM controller.

In this case there arises the problem that with low-cost PWM controllers the internal Zener diode has a tolerance of approx. 20% for current limiting (e.g. breakdown voltage 0.9V-1.1V). This means that during a switching cycle of the DC-DC converter the increasing coil or, as the case may be, primary winding current is limited e.g. once already at 9A and another time only at 11A. Since in the case of the flyback converter, for example, the square of the current is included in the output power, this leads to a great variance between DC-DC converters of per se identical design. Said variance can only be reduced by means of complicated trimming methods for each individual DC-DC converter, with each DC-DC converter having to include corresponding potentiometers.

An object of the invention is to disclose an improvement over the prior art for a method of the type cited in the introduction. A further object is to develop a DC-DC converter known from the prior art in such a manner that it is suitable for performing the method according to the invention.

This object is achieved according to the invention by a method and a DC-DC converter as claimed in the independent claims The method according to the invention provides that a voltage that is proportional to the current measuring signal is compared with a comparison voltage by means of a comparator and that if the comparison voltage is exceeded the converter switching element is turned off. In other words a comparator arranged in addition to the PWM controller is used for the current limiting instead of the internal Zener diode of the PWM controller. Said comparator is far cheaper than the extra costs for a PWM controller having correspondingly accurate internal current limiting. In this case a precise comparison voltage is specified to the comparator as a reference.

Thus, precise current limiting which requires no trimming methods of any kind and therefore renders trimming potentiometers superfluous is realized at little cost. In concrete terms the tolerance of the current limiting is improved from approx. ±20% to approx. ±2%.

The method according to the invention is performed by means of a DC-DC converter, comprising a PWM controller for controlling a converter switching element, wherein a current measuring signal for determining the turn-off times of the converter switching element is present at a current measuring input of the PWM controller. Included in the arrangement is a comparator whose first input is connected to a measuring point at which a voltage that is proportional to the current measuring signal is applied. The second input of the comparator is connected to a comparison voltage source and an output signal for turning off the converter switching element is present at the comparator output.

In a simple embodiment of the invention it is provided that if the comparison voltage is exceeded a signal which is present at the output of the comparator and which exceeds an internal current limiting value of the PWM controller is supplied to the PWM controller for the purpose of determining the turn-off times of the converter switching element. In this case the breakdown voltage of the internal Zener diode of the PWM controller is defined as the internal current limiting value.

The DC-DC converter is in this case advantageously embodied in such a way that the output of the comparator is connected via a diode to the current measuring input of the PWM controller.

The signal that is proportional to the increasing coil or, as the case may be, primary winding current is present, for example, as a voltage dropping across a shunt resistor at the comparator input. If the voltage regulator allows maximum output power, the current continues to increase until the voltage dropping across the shunt resistor reaches the value of the comparison voltage. The output signal of the comparator changes from Low to High and in the process exceeds the upper tolerance limit of the breakdown voltage of the internal Zener diode, thereby causing the internal comparator of the PWM controller to flip and as a further consequence the converter switching element to be turned off.

An improved method provides that if the comparison voltage is exceeded a High signal present at the output of the comparator is supplied to an auxiliary switching element which switches over a control signal for controlling the converter switching element in such a way that the converter switching element is turned off.

In order to perform said method the voltage that is proportional to the current measuring signal is present at the positive input of the comparator and the comparison voltage is present at the negative input of the comparator; in addition the output of the comparator is connected to the control terminal of the auxiliary switching element for the purpose of switching over a control signal supplied to the converter switching element.

What is achieved by means of said advantageous embodiment of the invention is that an internal delay (approx. 200 ns) of the PWM controller is eliminated. Thus, the converter switching element turns off as soon as the additionally arranged comparator flips, and not just when the internal comparator of the PWM controller registers that the current limiting value has been exceeded. It is ensured by way of a regenerative feedback by means of a resistor and a capacitor at the positive input of the comparator that the comparator will remain stable for a time period extending beyond the delay of the PWM controller and that the converter switching element will not be turned on again.

According to a further improvement of the method it is provided that if the comparison voltage is exceeded a Low signal present at the output of the comparator is supplied to a first auxiliary switching element which switches over a control voltage for the purpose of controlling the converter switching element in such a way that the converter switching element is turned off. In addition the Low signal is supplied to a second auxiliary switching element by means of which an auxiliary signal which exceeds an internal current limiting value of the PWM controller is supplied to the PWM controller for the purpose of determining the turn-off times of the converter switching element.

In the case of a DC-DC converter for performing said improved method the voltage that is proportional to the current measuring signal is present at the negative input of the comparator and the comparison voltage is present at the positive input of the comparator, and the output of the comparator is connected to the control terminal of a first auxiliary switching element for the purpose of switching over a control signal supplied to the converter switching element. Furthermore the output of the comparator is connected to the control terminal of a second auxiliary switching element for the purpose of connecting a reference voltage to the current measuring input of the PWM controller.

By swapping over the comparator inputs it is avoided that the regenerative feedback by means of resistor and capacitor at the positive input for stabilizing the comparator state will affect the current measurement. Upon reaching the comparison voltage the comparator flips from the High state to the Low state, the control voltage of the converter switching element being switched over by way of the first auxiliary switching element. By means of the second auxiliary switching element an auxiliary signal is connected to the current measuring input of the PWM controller, said auxiliary signal exceeding the upper tolerance limit of the internal current limiting of the PWM controller.

Advantageously the auxiliary signal is derived from a reference voltage provided by the PWM controller, a value above the upper tolerance limit of the breakdown voltage of an internal Zener diode of the PWM controller being set for example by means of a voltage divider.

Furthermore it is favorable if the comparison voltage is derived by means of a voltage divider from a reference voltage provided by the PWM controller.

BRIEF DESCRIPTION OF THE DRAWINGS

The invention is explained below in an exemplary manner with reference to the attached schematic figures, in which.

DETAILED DESCRIPTION OF INVENTION

Figure 1:
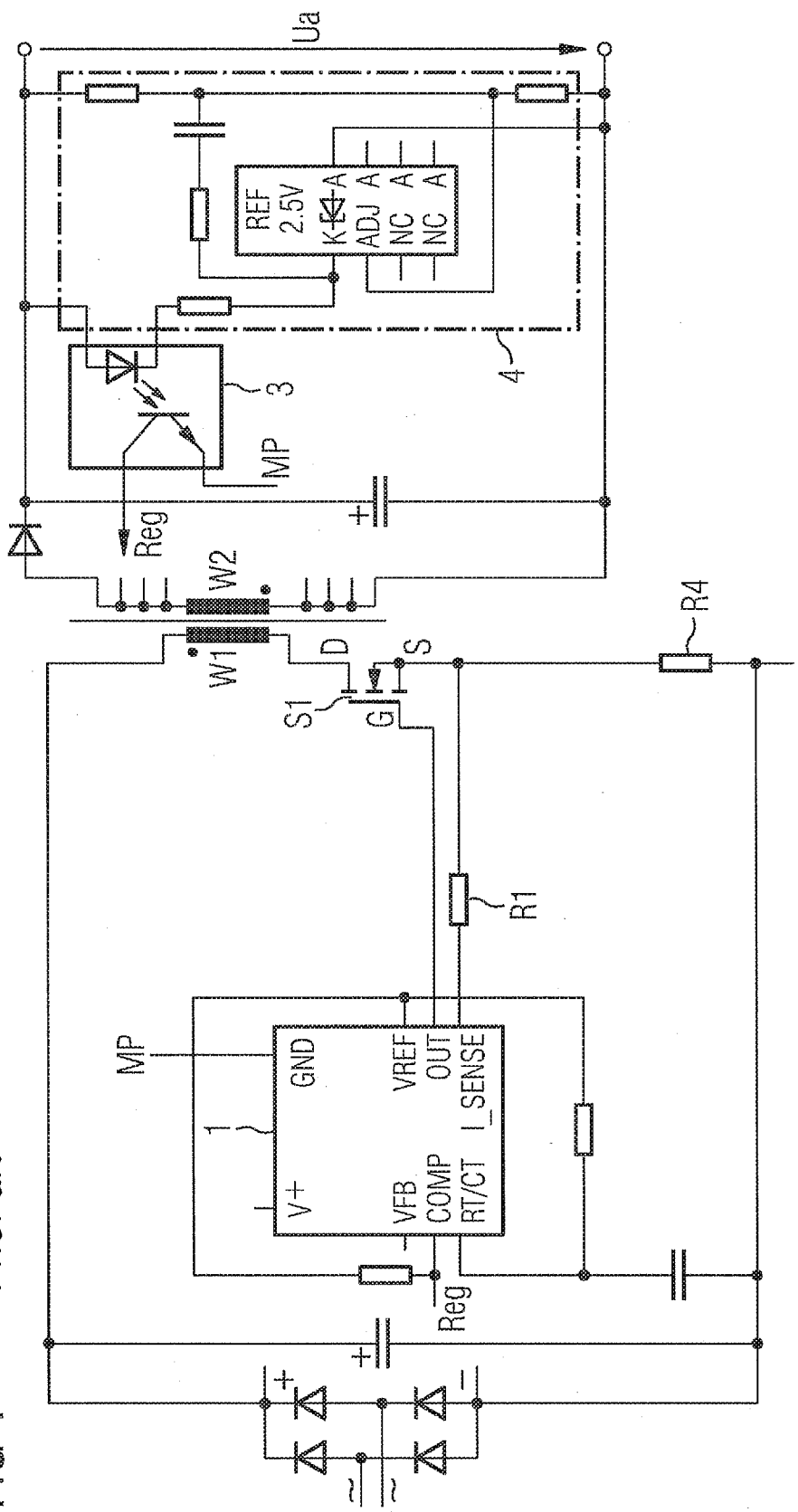
FIG. 1 shows a DC-DC converter having flyback converter topology according to the prior art.

The flyback converter shown in FIG. 1 comprises, in a known manner, a transformer having a primary winding W1 and an oppositely wound secondary winding W2. A converter switching element S1 embodied as an insulated gate field-effect transistor (MOS-FET) connects an intermediate circuit voltage formed from an alternating voltage to the primary winding W1.

The gate terminal G of the converter switch S1 is connected to the switching signal output OUT of a PWM controller 1 (e.g. Unitrode Uc3842). The output signal Reg of the voltage regulator 4 arranged on the secondary side is supplied to the PWM controller 1 via a COMP terminal by means of an optocoupler 3. Said voltage regulator 4 forms the reference signal for the current-mode control by means of an adjustable Zener diode (e.g. REF 2.5V) from a rectified and smoothed output voltage Ua.

The transmitted output signal Reg is compared in the PWM controller 1 with the current measuring signal present at the current measuring input I-SENSE. The current measuring signal is in this case formed by means of a shunt resistor R4 which is arranged between the source terminal S of the converter switching element S1 and a reference potential MP. The voltage dropping across said shunt resistor R4 is connected via a first resistor R1 to the current measuring input I-SENSE. If the increasing current measuring signal reaches the predefined reference value, the converter switching element S1 is turned off.

If, as a result of a high output power specification of the voltage regulator 4, the current measuring signal exceeds the current limiting value specified by means of an internal Zener diode in the PWM controller 1, a turn-off will be effected already at said current limiting value, with the problems caused by the current limiting tolerance and explained in the introduction to the description occurring.

Figure 2:
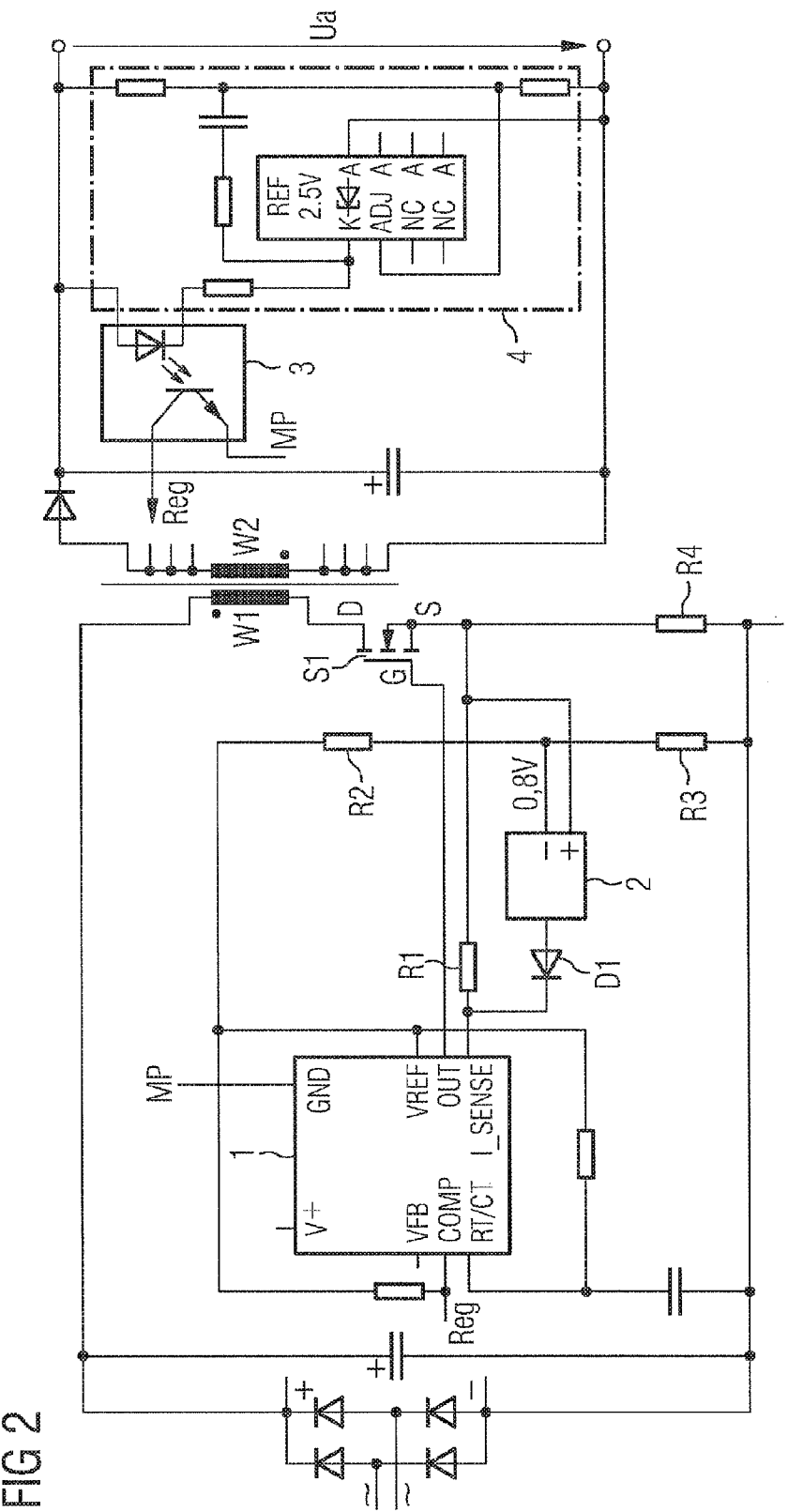
FIG. 2 shows a simple embodiment of the invention having flyback converter topology.

An embodiment of the solution according to the invention for avoiding said problems is shown in FIG. 2. In this case an additional comparator 2 is incorporated in the layout of the flyback converter shown in FIG. 1. A comparison voltage (e.g. 0.8V) is applied to the negative input of the comparator 2. The comparison voltage is derived from a reference voltage provided at a reference voltage output VREF of the PWM controller 1 by means of a voltage divider formed from two resistors R2, R3. The current measuring signal which can be tapped at the source terminal S of the converter switching element S1 (i.e. the voltage dropping across the shunt resistor R4) is present at the positive terminal of the comparator 2.

If the current measuring signal exceeds the value of the comparison voltage, the output signal of the comparator 2 switches from Low to High. In this case the High value of the output signal supplied via a diode to the current measuring input I-SENSE of the PWM controller 1 exceeds the upper tolerance limit of the internal voltage limiting of the PWM controller 1. Consequently the PWM controller 1 turns off the converter switching element S1. It is important to note that the comparison voltage must be less than the lower tolerance limit of the breakdown voltage of the internal Zener diode which determines the internal current limiting value of the PWM controller (e.g. 0.8V<0.9V-1.1V). The effective current limiting value is thus specified by means of the pre-defined comparison voltage.

The source terminal S of the converter switching element S1 continues to remain connected to the current measuring input I-SENSE of the PWM controller also via the first resistor R1, with the result that if a reference current specified by the voltage regulator 4 is less than the effective current limiting value specified by means of the comparison voltage, the current-mode control operates unaffected by the additional comparator 2.

Figure 3:
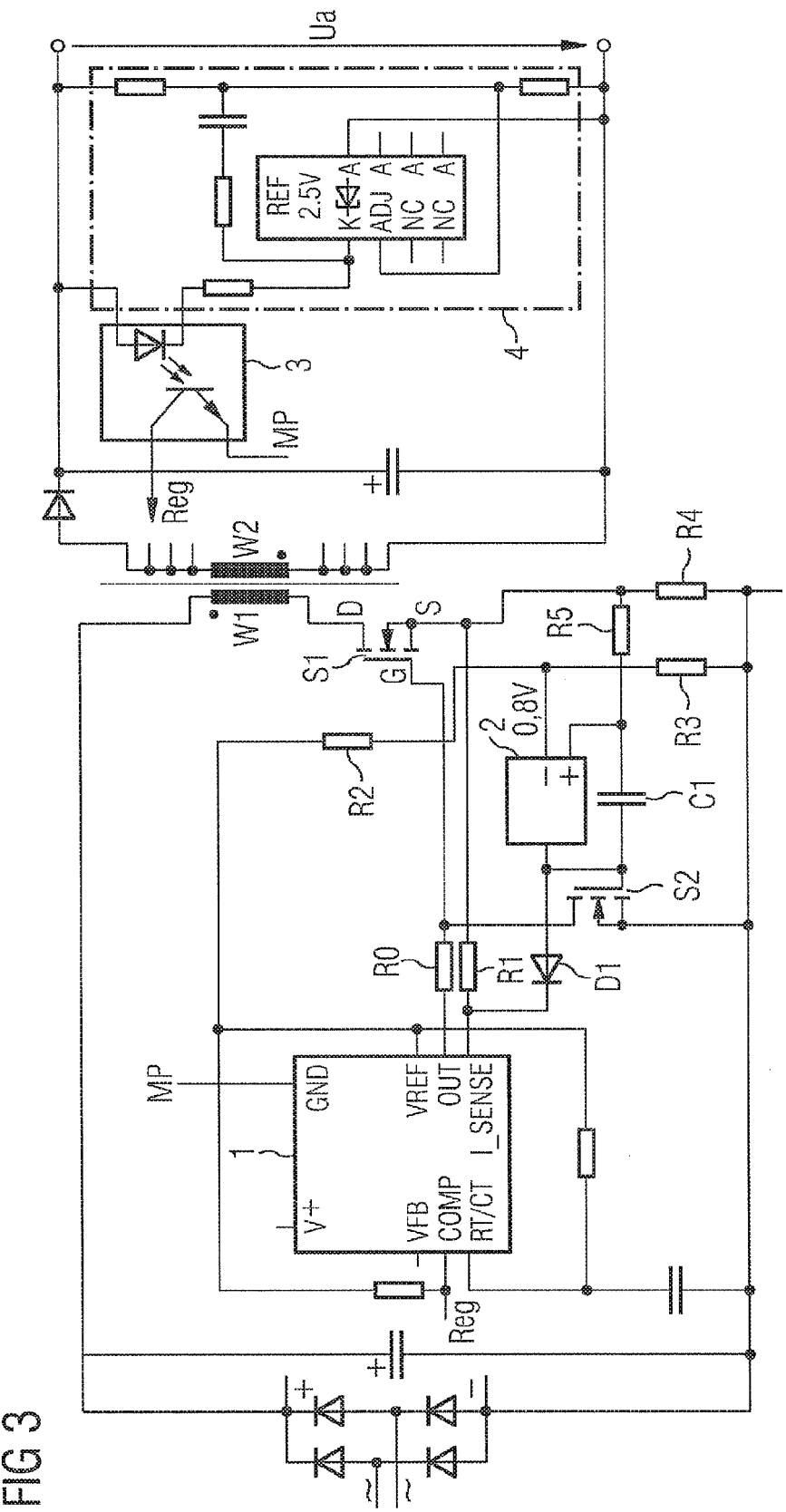
FIG. 3 shows an embodiment of the invention having flyback converter topology and reduced turn-off delay.

A further embodiment of the invention, shown in FIG. 3, provides the arrangement of an auxiliary switching element S2 which is controlled by means of a comparator 2. In this case the comparison voltage is specified in accordance with the previously described embodiment of the invention at the negative input of the comparator 2. The positive input is connected to the source terminal S of the converter switching element S1 via a fifth resistor R5.

The comparator 2 flips from Low to High if the voltage present at the shunt resistor R4 exceeds the comparison voltage. As previously, the output signal of the comparator 2, whose High value exceeds the upper tolerance limit of the internal current limiting of the PWM controller 1, is brought to the current measuring input I-SENSE of the PWM controller 1 via a diode D1. In parallel therewith the output of the comparator 2 is connected to the gate terminal of the auxiliary switching element. The auxiliary switching element turns on as a result of the signal change from Low to High. The source terminal of the auxiliary switching element S2 is in this case connected to a connecting point between the switching signal output OUT of the PWM controller 1 and the gate terminal G of the converter switching element S1 and the drain terminal of the auxiliary switching element S2 is connected to the reference potential MP. In addition a resistor RO is arranged between the connecting point and the switching signal output OUT.

Turning on the auxiliary switching element S2 therefore causes the switching signal to drop at the gate terminal G of the converter switching element Si and the converter switching element Si to be turned off Thus, by means of said arrangement the internal response delay (approx. 200 ns) of the PWM controller is eliminated. In this case it must, however, be ensured that the auxiliary switching element S2 remains turned on until the PWM controller 1 turns off the switching signal at the switching signal output OUT as a result of the internal current limiting value being exceeded at the current measuring input I-SENSE, in other words during the aforementioned response delay.

This is achieved by means of the arrangement of a capacitor C3 between the output and the positive input of the comparator 2. By way of said regenerative feedback implemented by means of the capacitor C3 and the fifth resistor it is ensured that the comparator 2 will remain stable for a time period extending beyond the response delay of the PWM controller 1 (e.g. 300 ns) and the converter switching element S1 will not be turned on again.

Figure 4:
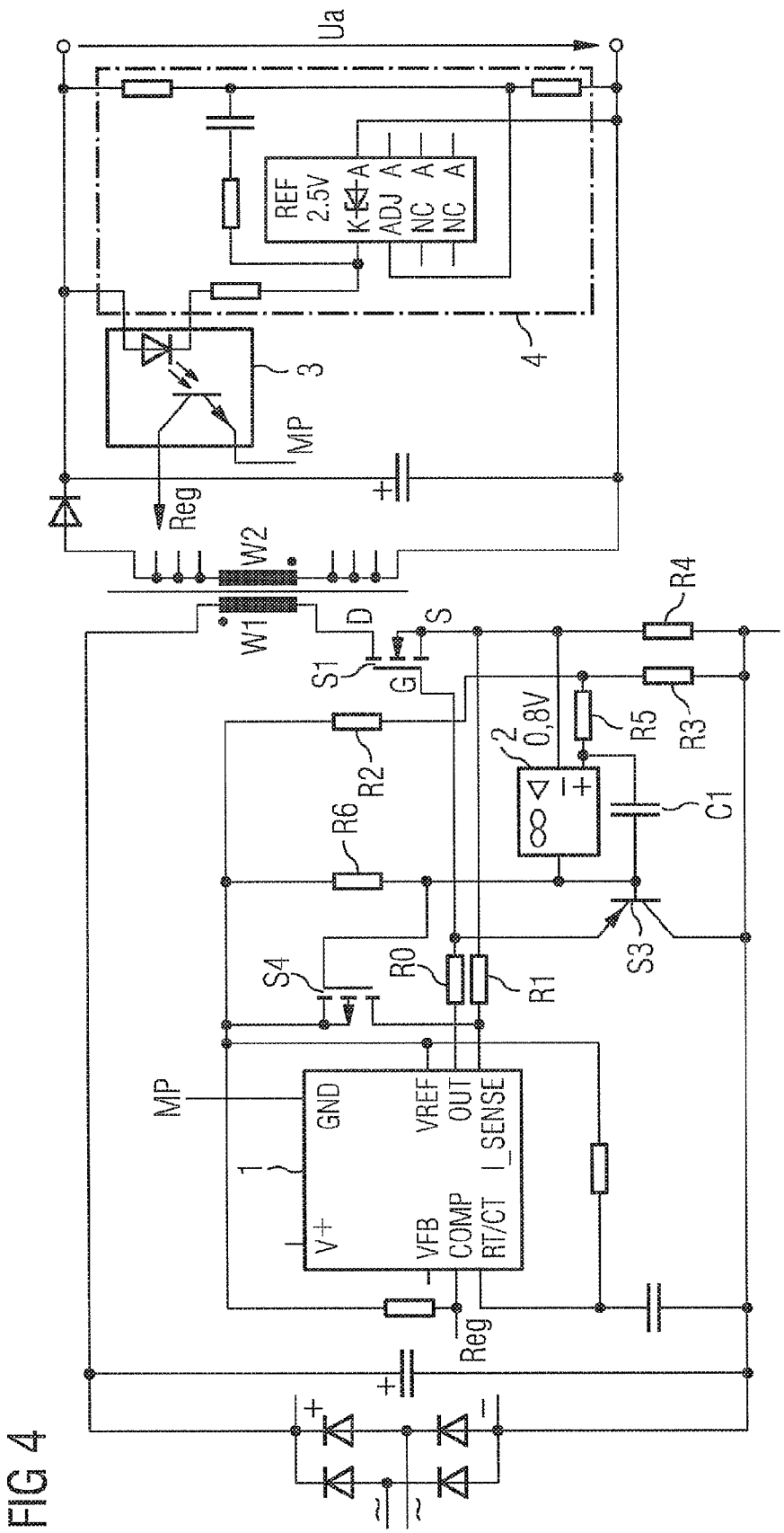
FIG. 4 shows an embodiment of the invention having flyback converter topology, reduced turn-off delay and unaffected current measurement.

Said regenerative feedback does, however, attenuate the voltage rise at the shunt resistor R4. In order to avoid this, an arrangement having the inputs of the comparator transposed is provided, as shown in FIG. 4. The comparison voltage is therefore present at the positive input of the comparator 2, and the negative input is connected directly to the source terminal S of the converter switching element S1. A regenerative feedback by means of the capacitor C1 and the fifth resistor R5 is once again provided between positive input of the comparator for the purpose of stabilizing the comparator output signal.

If the voltage drop across the shunt resistor R4 reaches the comparison voltage, the comparator 2 flips from High to Low. In this case the output of the comparator 2 is connected to the base terminal of a first auxiliary switching element S3 embodied as a PNP transistor. The signal changeover from High to Low causes the first auxiliary switching element S3 to turn on, as a result of which the switching signal at the gate terminal G of the converter switching element S1 is once again pulled to the reference potential MP; the converter switching element S1 is turned off.

In parallel therewith the output of the comparator 2 is connected to the gate terminal of a second auxiliary switching element S4 embodied as a MOSFET. The source terminal of said auxiliary switching element S4 is connected to a reference voltage and the drain terminal is connected to the current measuring input I-SENSE of the PWM controller 1. A sixth resistor R6 is arranged between source terminal and gate terminal. A control voltage of the second auxiliary switching element S4 drops at said sixth resistor R6 as soon as the output of the comparator 2 changes from High to Low. By way of the second auxiliary switching element S4 turned on in this way there is applied to the current measuring input I-SENSE of the PWM controller 1 a voltage which exceeds the upper tolerance limit of the internal current limiting and consequently leads to the turn-off at the switching signal output OUT.

It is self-evident that the current limiting by means of an additional comparator described in relation to the flyback converter can be implemented in the same manner for all other types of converter using current-mode control.

The invention claimed is:

1. A method of operating a DC-DC converter based upon a current-mode-control principle, comprising:
   providing a PWM controller, a converter switching element and a comparator;
   supplying a current measuring signal to the PWM controller for determining turn-off times of the converter switching element;

comparing a voltage that is proportional to the current measuring signal with a comparison voltage by the comparator;

turning off the converter switching element when the comparison voltage is exceeded; and providing an auxiliary switching element, wherein, when the comparison voltage is exceeded, a high signal present at an output of the comparator is supplied to the auxiliary switching element which switches over a control signal for controlling the converter switching element such that the converter switching element is turned off.

2. The method as claimed in claim 1, wherein, when the comparison voltage is exceeded, a signal being present at an output of the comparator and exceeding a current limiting value of the PWM controller is supplied to the PWM controller for determining the turn-off times of the converter switching element.

3. The method as claimed in claim 1, further comprising:
a first auxiliary switching element and a second auxiliary element, wherein, when the comparison voltage is exceeded,
a low signal present at an output of the comparator is supplied to the first auxiliary switching element which switches over a control voltage for controlling the converter switching element such that the converter switching element is turned off, and
the low signal is supplied to the second auxiliary switching element which supplies an auxiliary signal exceeding a current limiting value of the PWM controller to the PWM controller for determining the turn-off times of the converter switching element.

4. The method as claimed in claim 3, wherein the auxiliary signal is derived from a reference voltage provided by the PWM controller.

5. The method as claimed in claim 1, wherein the comparison voltage is derived by a voltage divider from a reference voltage provided by the PWM controller.

6. A DC-DC converter, comprising:
a converter switching element;
a PWM controller for controlling the converter switching element;
a current measuring signal for determining turn-off times of the converter switching element, the current measuring signal being present at a current measuring input of the PWM controller; and
a comparator,
wherein a first input of the comparator is connected to a measuring point, a voltage being applied to the measuring point, the voltage being proportional to the current measuring signal,
wherein a second input of the comparator is connected to a comparison voltage source, and
wherein an output signal is present at an output of the comparator for turning off the converter switching element, and
an auxiliary switching element,
wherein
the voltage which is proportional to the current measuring signal is present at an positive input of the comparator,
the comparison voltage is present at an negative input of the comparator, and
the output of the comparator is connected to a control terminal of the auxiliary switching element for switching over a control signal supplied to the converter switching element.

7. The DC-DC converter as claimed in claim 6, further comprising:
a first auxiliary switching element and a second auxiliary switching element,
wherein
the voltage which is proportional to the current measuring signal is present at a negative input of the comparator,
the comparison voltage is present at a positive input of the comparator,
the output of the comparator is connected to a control terminal of the first auxiliary switching element for switching over a control signal supplied to the converter switching element, and
the output of the comparator is connected to a control terminal of the second auxiliary switching element for connecting a reference voltage to the current measuring input of the PWM controller.

8. The DC-DC converter as claimed in claim 6, wherein the output of the comparator is connected to the current measuring input of the PWM controller via a diode.

* * * * *

UNITED STATES PATENT AND TRADEMARK OFFICE
CERTIFICATE OF CORRECTION

PATENT NO. : 8,416,589 B2
APPLICATION NO. : 12/809188
DATED : April 9, 2013
INVENTOR(S) : Daniel Portisch Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 319 days.

Signed and Sealed this
Seventeenth Day of September, 2013

Teresa Stanek Rea
*Deputy Director of the United States Patent and Trademark Office*